(12) United States Patent
Kloeppel et al.

(10) Patent No.: US 11,786,910 B2
(45) Date of Patent: Oct. 17, 2023

(54) SAFETY COVER

(71) Applicant: BLUE SKY INNOVATION GROUP, INC., Sheffield Village, OH (US)

(72) Inventors: Gregg M. Kloeppel, Sheffield Lake, OH (US); Dale J. Zidan, Eastlake, OH (US)

(73) Assignee: BLUE SKY INNOVATION GROUP, INC., Sheffield Village, OH (US)

( * ) Notice: Subject to any disclaimer, the term of this patent is extended or adjusted under 35 U.S.C. 154(b) by 0 days.

(21) Appl. No.: 17/730,262

(22) Filed: Apr. 27, 2022

(65) Prior Publication Data

US 2022/0339637 A1 Oct. 27, 2022

Related U.S. Application Data

(60) Provisional application No. 63/180,124, filed on Apr. 27, 2021.

(51) Int. Cl.
*B02C 18/30* (2006.01)
*A47J 43/07* (2006.01)
*B02C 18/16* (2006.01)

(52) U.S. Cl.
CPC ........... *B02C 18/305* (2013.01); *A47J 43/075* (2013.01); *B02C 18/30* (2013.01); *B02C 2018/168* (2013.01)

(58) Field of Classification Search
CPC . B02C 18/305; B02C 18/30; B02C 2018/168; A47J 43/075
See application file for complete search history.

(56) References Cited

U.S. PATENT DOCUMENTS

| 1,575,840 A | * | 3/1926 | Hamilton | B02C 18/305 241/301 |
| 2,087,474 A | * | 7/1937 | Green | B02C 18/305 241/285.2 |
| 2,751,950 A | * | 6/1956 | Scott | B02C 18/305 241/301 |
| 2,779,369 A | * | 1/1957 | Biro | F16P 1/02 241/82.5 |

(Continued)

FOREIGN PATENT DOCUMENTS

GB 2457909 A * 9/2009 ........... B02C 18/305

*Primary Examiner* — Faye Francis
(74) *Attorney, Agent, or Firm* — TAROLLI, SUNDHEIM, COVELL & TUMMINO L.L.P.

(57) ABSTRACT

A meat grinder safety cover attachment for a meat grinder grinding head that prevents an operator of the meat grinder from entering hand or fingers into the inlet throat of the grinder where a turning auger starts the grinding of meat. The grinder safety cover has two functional states: a normally closed state and an actuated open state. Moving from the normally closed state to the actuated open state is initiated by applying a linear force by depressing a slide plunger pin that engages the slide covers covering the grinder head inlet throat. The slide plunger pin and slide covers are configured to convert the linear motion of the slide plunger pin to rotational motion of the slide covers, opening the slide covers and uncovering the inlet throat of the grinder head. Removing the depression force on the slide plunger pin, the torsion spring attached to the slide covers and a return spring in the slide plunger pin then return the safety cover to its normally closed position.

14 Claims, 13 Drawing Sheets

(56) References Cited

U.S. PATENT DOCUMENTS

| | | | | |
|---|---|---|---|---|
| 2,821,228 A | * | 1/1958 | Hall | B02C 18/305 241/37.5 |
| 3,014,515 A | * | 12/1961 | Meeker | F16P 3/08 241/37.5 |
| 3,109,472 A | * | 11/1963 | Lasar | B02C 18/305 241/37.5 |
| 3,115,173 A | * | 12/1963 | Brown | B02C 18/305 241/285.1 |
| 3,132,679 A | * | 5/1964 | Rees | B02C 18/305 241/37.5 |
| 2015/0328643 A1 | * | 11/2015 | Van Beers | B02C 18/2258 241/82.1 |

* cited by examiner

SAFETY COVER

RELATED APPLICATION

This application claims the benefit of U.S. Provisional Application Ser. No. 63/180,124, filed on Apr. 27, 2021, the disclosure of which is hereby incorporated by reference in its entirety.

TECHNICAL FIELD

This disclosure is related generally to safety features for food processing equipment and, more specifically, to a safety cover for a grinder.

BACKGROUND

Meat grinders include a grinding head with an inlet throat into which meat is placed so that it engages a turning auger that forces the meat through a grinding blade. During use, it is desirable to provide protection for hands and fingers possibly entering the grinder head through the inlet throat and engaging the auger and/or cutting knife of the meat grinder.

SUMMARY

A meat grinder safety cover attachment for a meat grinder grinding head that prevents an operator of the meat grinder from entering hand or fingers into the inlet throat of the grinder where a turning auger starts the grinding of meat. The grinder safety cover has two functional states: a normally closed state and an actuated open state. Moving from the normally closed state to the actuated open state is initiated by applying a linear force by depressing a slide plunger pin that engages the slide covers covering the grinder head inlet throat. The slide plunger pin and slide covers are configured to convert the linear motion of the slide plunger pin to rotational motion of the slide covers, opening the slide covers and uncovering the inlet throat of the grinder head. Removing the depression force on the slide plunger pin, the torsion spring attached to the slide covers and a return spring in the slide plunger pin then return the safety cover to its normally closed position.

According to one aspect a grinder safety cover attachment is configured to be clamped to an inlet throat of a grinding head of a meat grinder and having an open condition for permitting access to the inlet throat and a closed condition blocking access to the inlet throat. The safety cover includes a left mounting bracket and right mounting bracket configured to fit onto an outer surface of the inlet throat of the grinder head through fixation of a clamping screw that draws the mounting brackets toward each other so that the mounting brackets form a closed ring that clamps onto the outer surface of the inlet throat. The safety cover also includes a left slide cover and a right slide cover mounted in engagement with and parallel to top surfaces of the left and right mounting brackets. The left and right slide covers are rotational relative to each other and relative to the mounting brackets to place the safety cover in the open condition and closed conditions. The slide covers move away from each other in the open condition of the safety cover to permit access to the inlet throat. The slide covers move toward each other and into engagement with each other in the closed condition of the safety cover to block access to the inlet throat. The slide covers are spring biased to the closed condition. The safety cover also includes a slide plunger pin configured to be actuated through the application of an actuation force urged by depressing the slide plunger pin linearly into engagement with the left and right slide covers, which causes them to rotate relative to each other and to the mounting brackets to the open condition. The left and right slide covers are configured to return to the closed condition in response to the removal of the actuation force.

According to another aspect, the left and right mounting brackets can have first ends pivotally connected to each other and opposite second ends configured to be connected to each other with a locking pin. The left and right mounting brackets each can have a semi-circular configuration and, when connected with the locking pin, form a closed circular ring with a cylindrical inner surface configured to engage and mate with the cylindrical outer surface of the inlet throat.

According to another aspect, alone or in combination with any other aspect, the mounting brackets can include an annular rim for engaging an edge of a mouth of the inlet throat.

According to another aspect, alone or in combination with any other aspect, the safety cover can also include a friction screw that engages the outer surface of the grinder head to lock the safety cover onto the inlet throat and to preventing rotation of the safety cover about the inlet throat.

According to another aspect, alone or in combination with any other aspect, the left and right slide covers can be pivotally connected to the mounting brackets by a retaining screw.

According to another aspect, alone or in combination with any other aspect, the slide plunger pin can be retained in a recessed groove in an upper surface of an actuator portion of one or both of the mounting brackets. The slide plunger pin can be retained in the recessed groove by the bottom surface of the left and right slide covers. The application of the actuation force can cause the slide plunger pin to move linearly in the recessed groove into engagement with the left and right slide covers, which causes them to rotate relative to each other and to the mounting brackets to the open condition.

According to another aspect, alone or in combination with any other aspect, the safety cover can also include a return spring that biases the slide plunger pin toward the non-actuated condition. The return spring can be configured to return the slide plunger pin to the non-actuated condition in response to removal of the actuation force.

According to another aspect, alone or in combination with any other aspect, the slide plunger pin can include a central slot in which the return spring is housed. The retaining screw can extend through the slide covers and the central slot can retain the slide plunger pin in the recessed groove. The return spring can bias the slide plunger pin against the retaining screw.

According to another aspect, alone or in combination with any other aspect, the slide plunger pin can include a pair of angled cam surfaces configured to engage respective bosses on the left and right slide covers. The cam surfaces when urged against the bosses on the slide covers can exert normal forces on the bosses that causes the slide covers to move toward the open condition of the safety cover against the spring bias urging the slide covers to the closed condition.

According to another aspect, alone or in combination with any other aspect, the left and right slide covers can slide in direct contact with the top surface of the mounting brackets and parallel to the top surface of the mounting brackets.

According to another aspect, alone or in combination with any other aspect, the safety cover can include a torsion spring for applying the spring bias to the left and right slide covers. The torsion spring can be housed in a spring housing that is retained in the actuator housing. The torsion spring can include spring extensions in mechanical contact with the left slide cover and right slide cover. The spring force applied by the torsion spring to the left slide cover and right slide cover can move the slide covers to a center normally closed position.

According to another aspect, alone or in combination with any other aspect, the left and right slide covers can include respective bosses on their lower surfaces. The bosses can be configured to slide within recessed grooves on the upper surface of the actuator housing. The recessed grooves can be configured to provide a rotational guide and opening limits for the left and right slide covers on the top surface of the mounting brackets. The recessed grooves can limit the rotational stroke of the left and right slide covers in the open position to the outer diameter of the grinding head inlet throat.

According to another aspect, alone or in combination with any other aspect, the safety cover can include a centering boss on the upper surface of the actuator housing. The centering boss can define stop points for the left and right slide covers. The centering boss can be configured so that the slide covers when limited by the centering boss are themselves centered over the circular ring opening of the connected left and right mounting brackets.

According to another aspect, alone or in combination with any other aspect, the slide plunger pin can facilitate opening the slide covers with a single hand of the operator by depressing the slide plunger pin.

DETAILED DESCRIPTION

Figure 2:
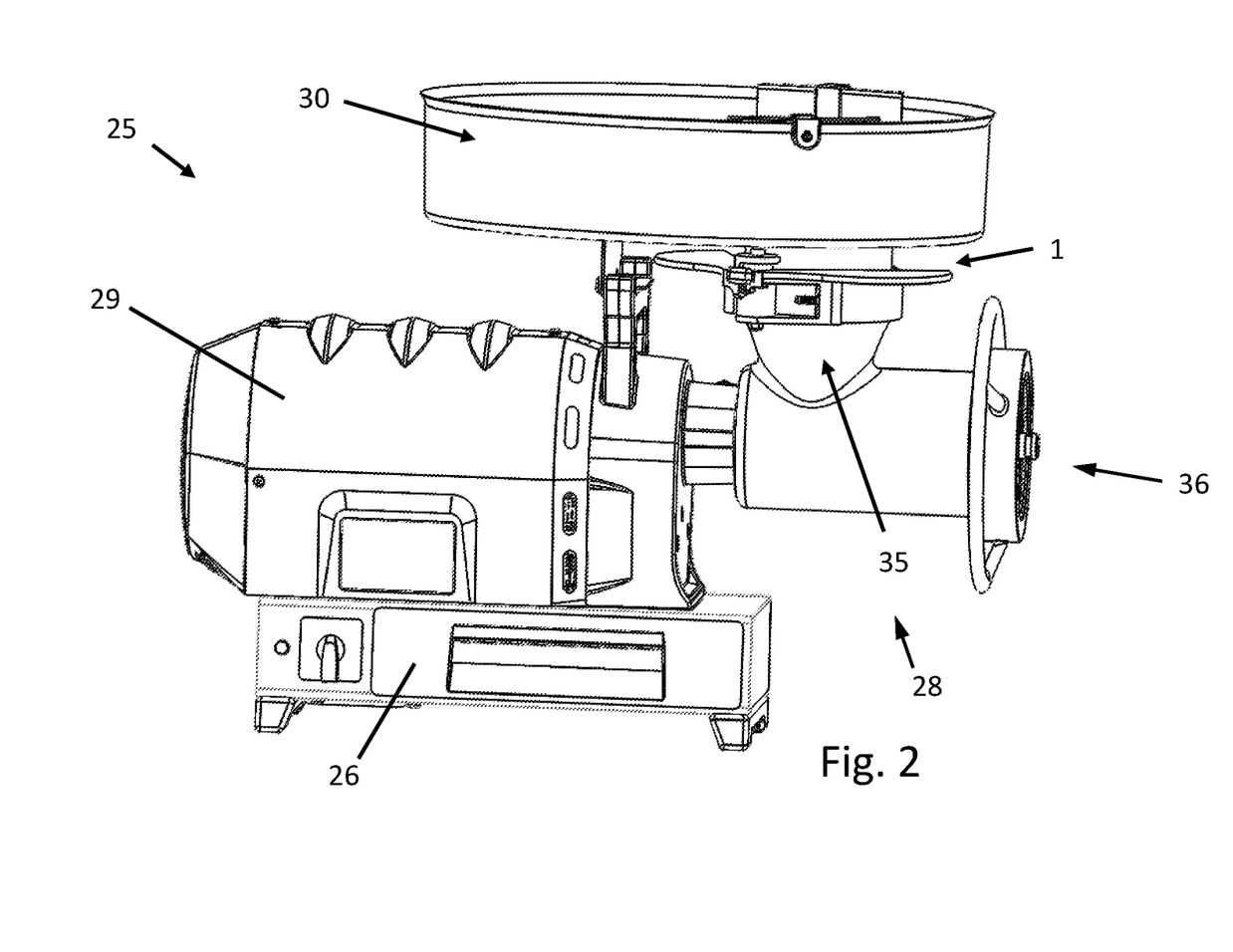
FIG. 2 is a side perspective view of a meat grinder with an attached safety cover.

Referring to FIG. 2, a meat grinder 25 includes a base 26, a motor unit 29, and a grinder head 28. A meat tray 30 is supported on the motor unit 29 and is configured to hold meat or other food products to be fed into the grinder head 28 via an inlet throat 35. The meat of food product is fed from the tray 30 through the inlet throat 35 and into the grinder head 28, where it is fed by an auger to a cutting knife (not shown), which grinds the food product. The ground food product discharged through an outlet 36 of the grinder head 28.

Figure 1:
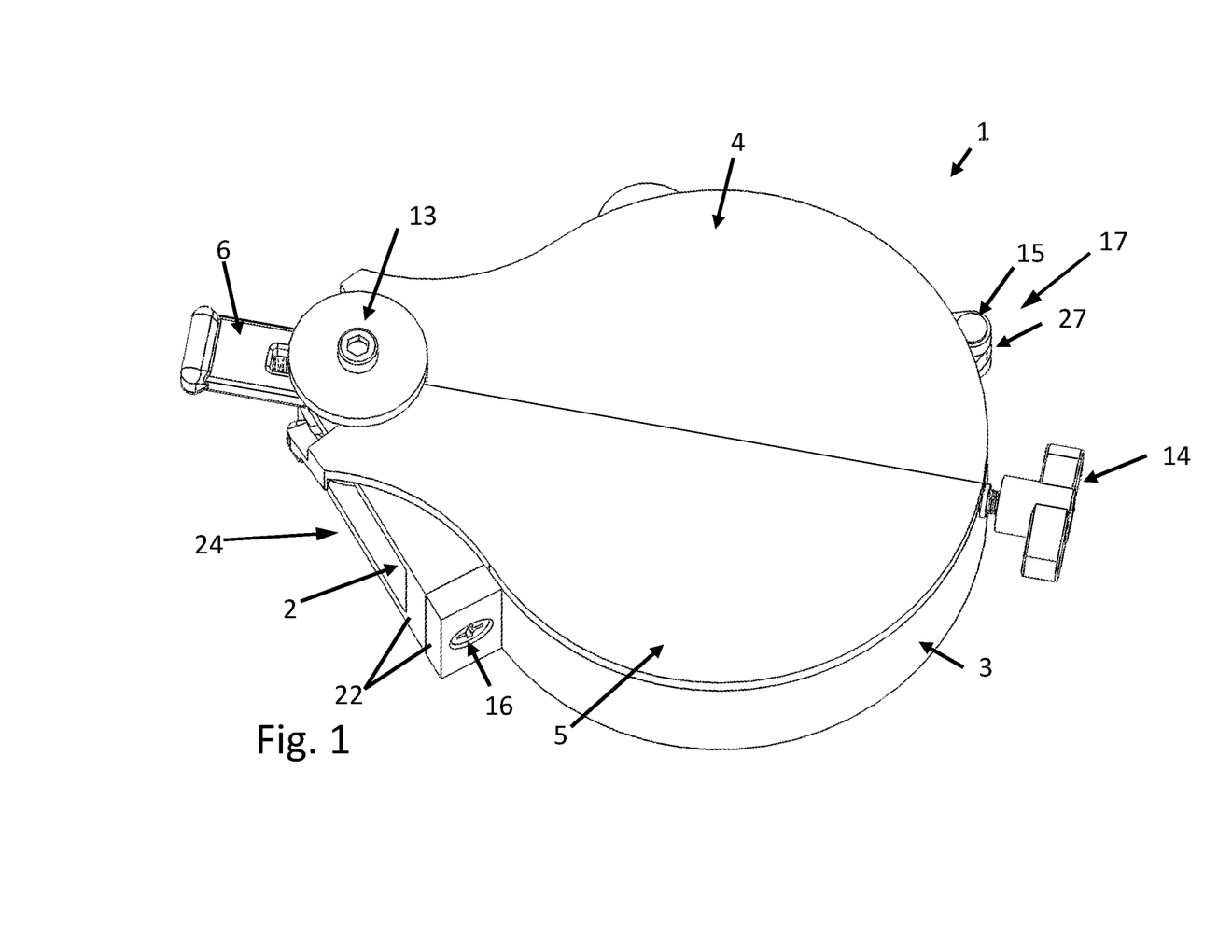
FIG. 1 is a top perspective view of the safety cover.

Referring to FIGS. 1 and 2, a safety cover 1 attaches to the inlet throat 35 of the grinder head 28. The safety cover 1 provides protection for hands and fingers possibly entering the grinder head 28 through the inlet throat 35 and engaging the auger and/or cutting knife of the meat grinder 25.

Referring to FIGS. 1, 3-5, and 8-19, the safety cover 1 includes a left mounting bracket 2 and right mounting bracket 3, each of which includes one or more extruded bosses 27. In an assembled condition of the safety cover 1, the bosses 27 are aligned with each other and a locking pin 15 is extended through their aligned openings to connect the mounting brackets 2, 3. The bosses 27 and pin 15 form a hinge 17 that allow the mounting brackets 2, 3 to pivot relative to each other about a hinge axis, which is defined along the central axis of the locking pin 15, between open and closed conditions.

As shown in FIGS. 1-5 and 8-19, the mounting brackets 2, 3 each have a semicircular configuration configured to extend 180-degrees around the inlet throat 35. In the closed condition (see, e.g., FIGS. 1-3, 8-19), the mounting brackets 2, 3 form a closed circular ring configured to extend 360-degrees around the inlet throat 35. To install the safety cover 1 on the grinder head 28, the mounting brackets 2, 3 are pivoted relative to each other, placing them in the open condition. With the mounting brackets 2, 3 in the open condition, the safety cover 1 is positioned on the grinder head 28 to encircle an outer circumference of the grinder head. To facilitate the installation, the safety cover 1 can include an annular rim 21 for engaging a mouth of the inlet throat 35, which is defined at an upper inlet edge 37 (see, e.g., FIG. 9) of the inlet throat 35.

At a location radially opposite the hinge 17, the mounting brackets 2, 3 include respective flanges 22 configured to engage each other when the mounting brackets are in the closed condition. The safety cover 1 includes a clamping screw 16 that extends through aligned openings in the flanges 22 and secures the flanges together through a threaded engagement, either with a mating fastener, such as a nut, or with internal threads on one or both of the flanges. The clamping screw locks the mounting brackets 2, 3 in the closed condition, which connects the safety cover 1 to the inlet throat 35 of the grinder head 28. The safety cover 1 also includes a friction screw 14, with a knob for hand tightening/loosening, is attached to the right mounting bracket 3. The friction screw can be had tightened to extend through the mounting bracket 3 and engage the outer surface of the inlet throat 35 to lock the mounting brackets 2, 3, and the safety cover 1, to the inlet throat. This locking helps prevent rotational slippage of the safety cover 1 about the outer circumference of the inlet throat 35.

The safety cover also includes left and right slide covers 4 and 5, respectively. The slide covers 4, 5 are pivotally secured to the mounting brackets 2, 3 by a retaining screw 13 that extends through aligned openings in respective slide cover mounting bosses 19 of the slide covers. To assemble the slide covers 4, 5 with the mounting brackets 2, 3, the slide cover mounting bosses 19 are positioned with their central openings in alignment with each other and with one or more fastener openings 23 in upper and lower plates of an actuator housing portion 24 of the left mounting bracket 2.

Figure 8:
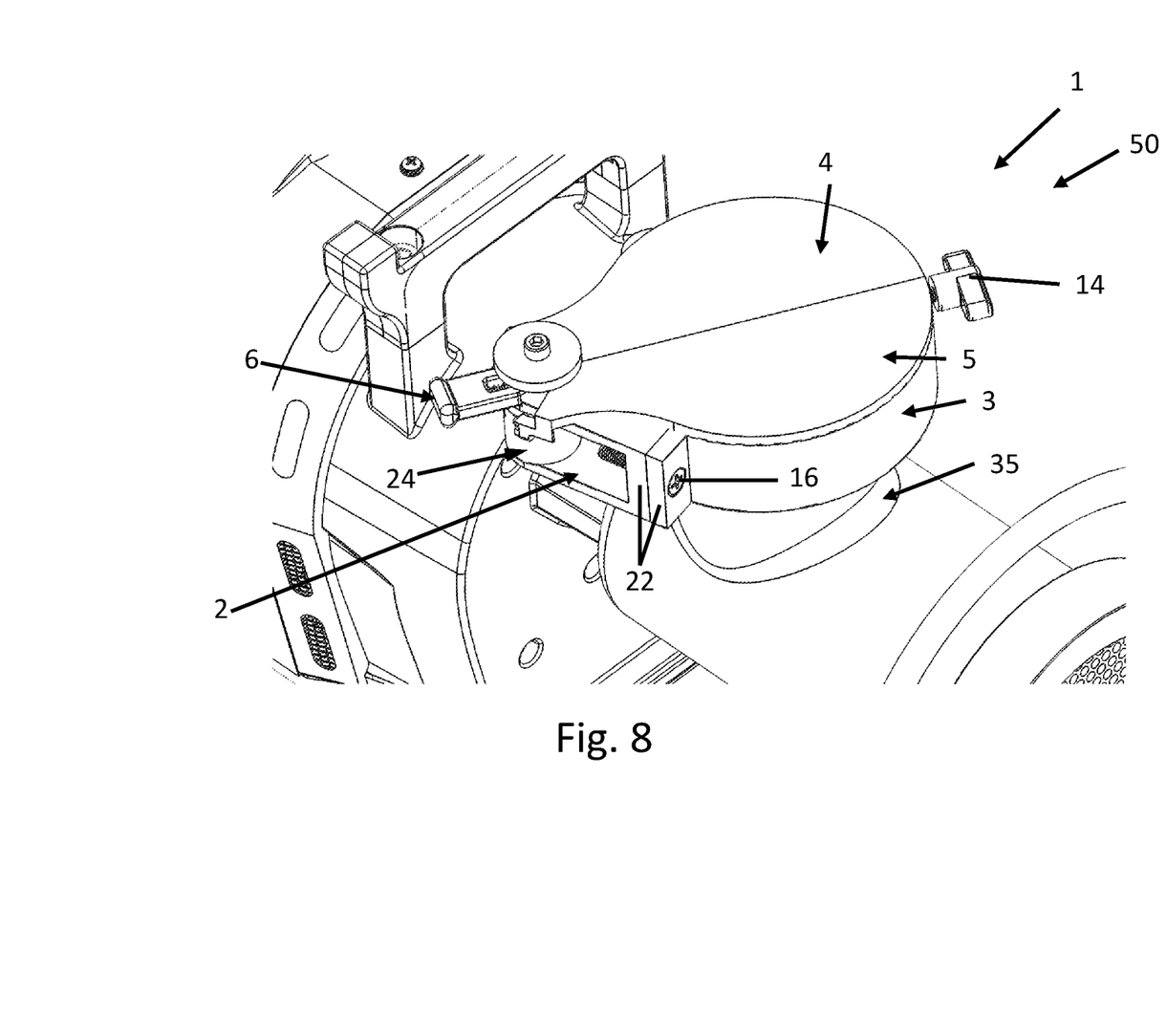
FIG. 8 is a perspective view detailing the safety cover installed on a grinder head throat with the safety cover in a closed condition blocking access to the inside of the meat throat leading to the meat grinding auger.
Figure 9:
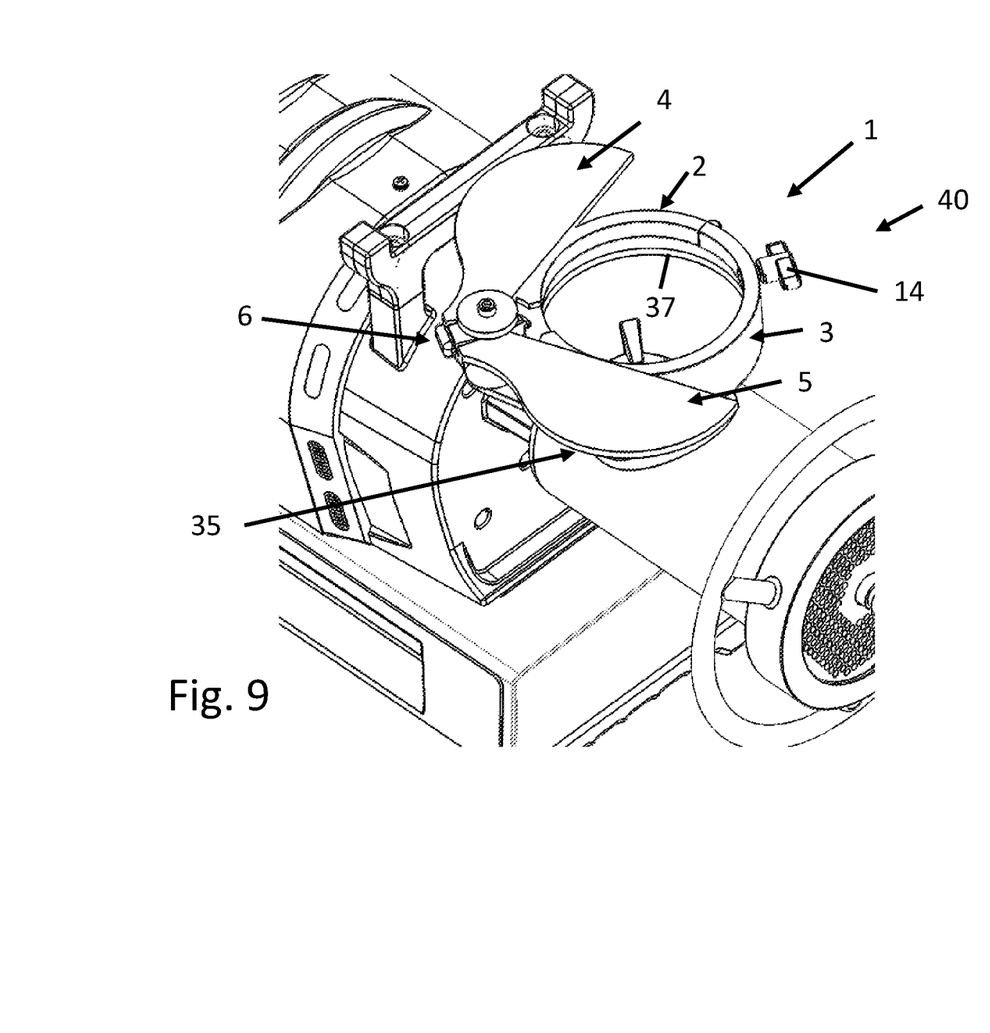
FIG. 9 is a perspective view detailing the safety cover installed on a grinder head throat with the safety cover in an open condition permitting access to the inside of the meat throat leading to the meat grinding auger.
Figure 10:
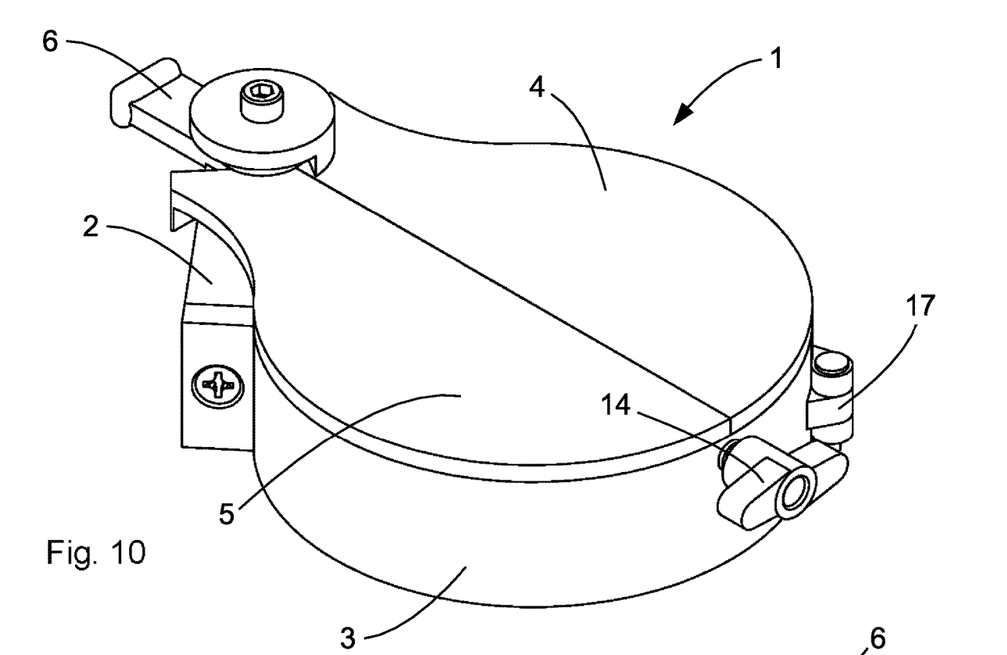
FIG. 10 is a top perspective view of the safety cover in a closed condition.
Figure 11:
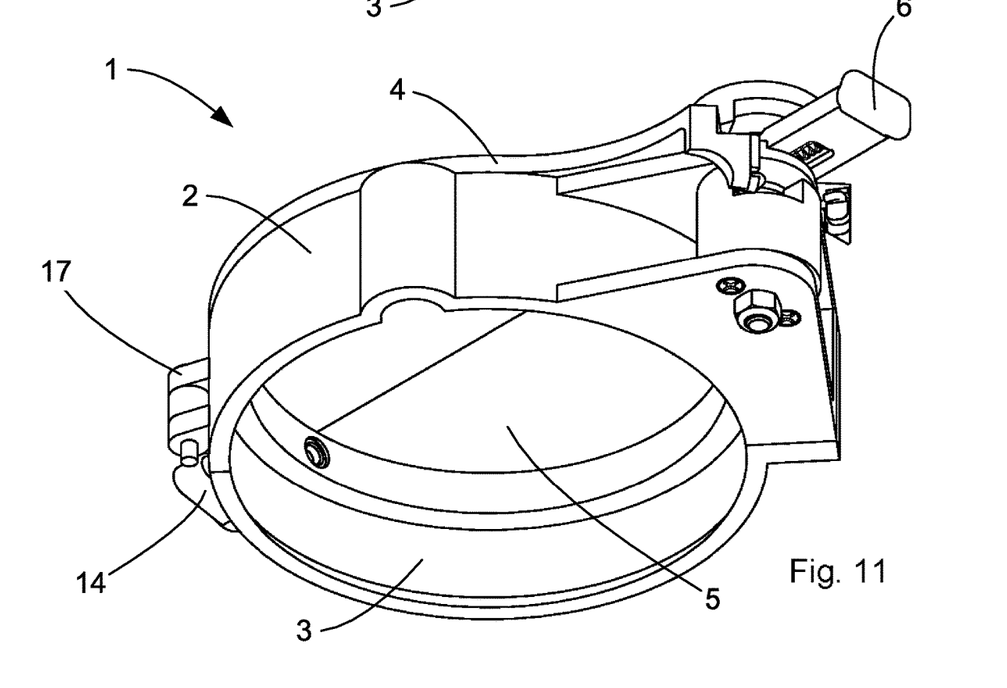
FIG. 11 is a bottom perspective view of the safety cover in the closed condition.
Figure 12:
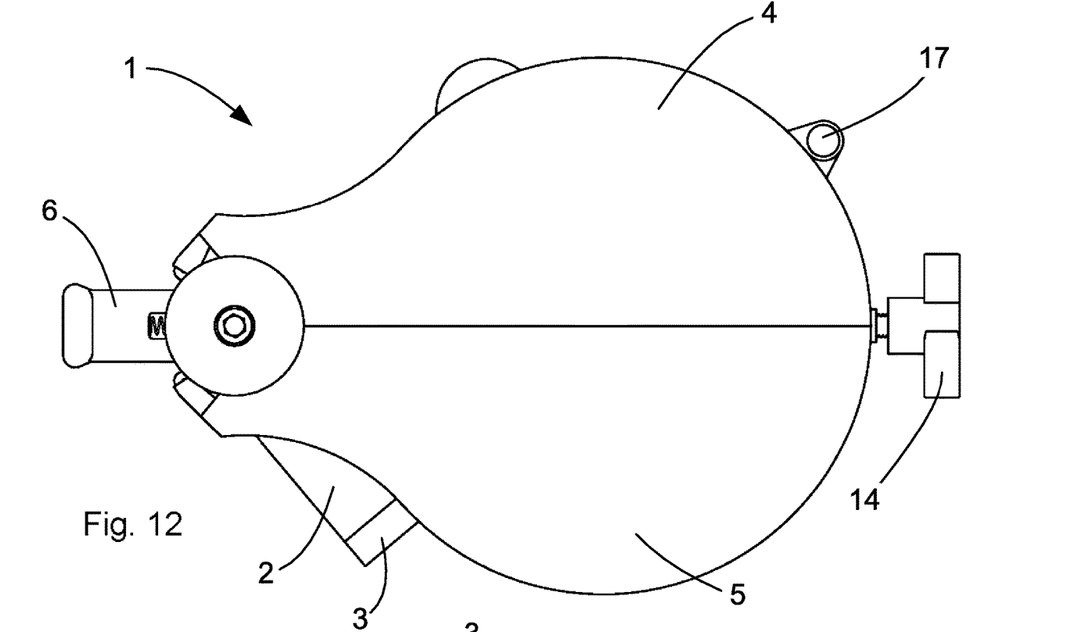
FIG. 12 is a top view of the safety cover in the closed condition.
Figure 13:
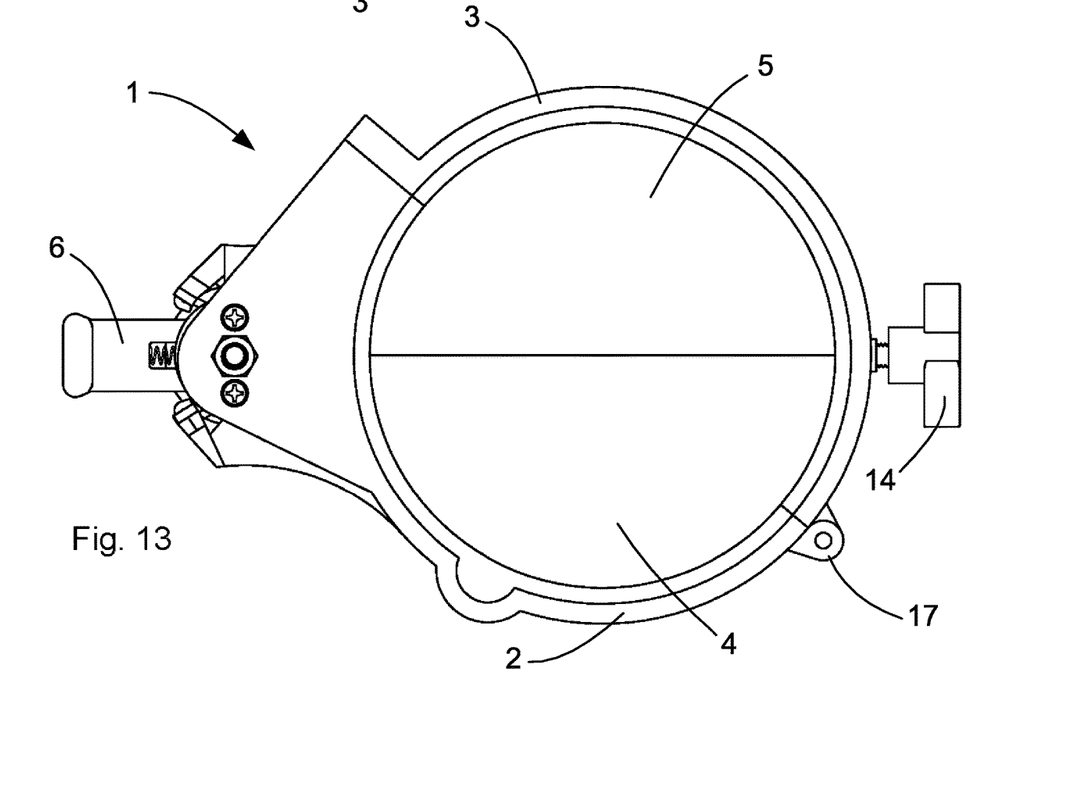
FIG. 13 is a bottom view of the safety cover in the closed condition.
Figure 14:
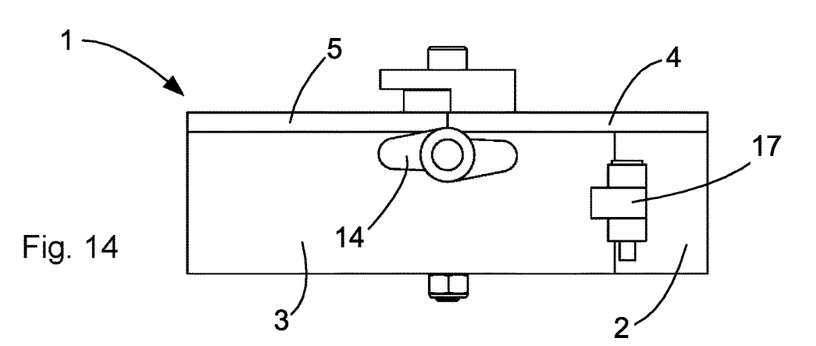
FIG. 14 is a front elevation view of the safety cover in the closed condition.
Figures 15, 16, 17:
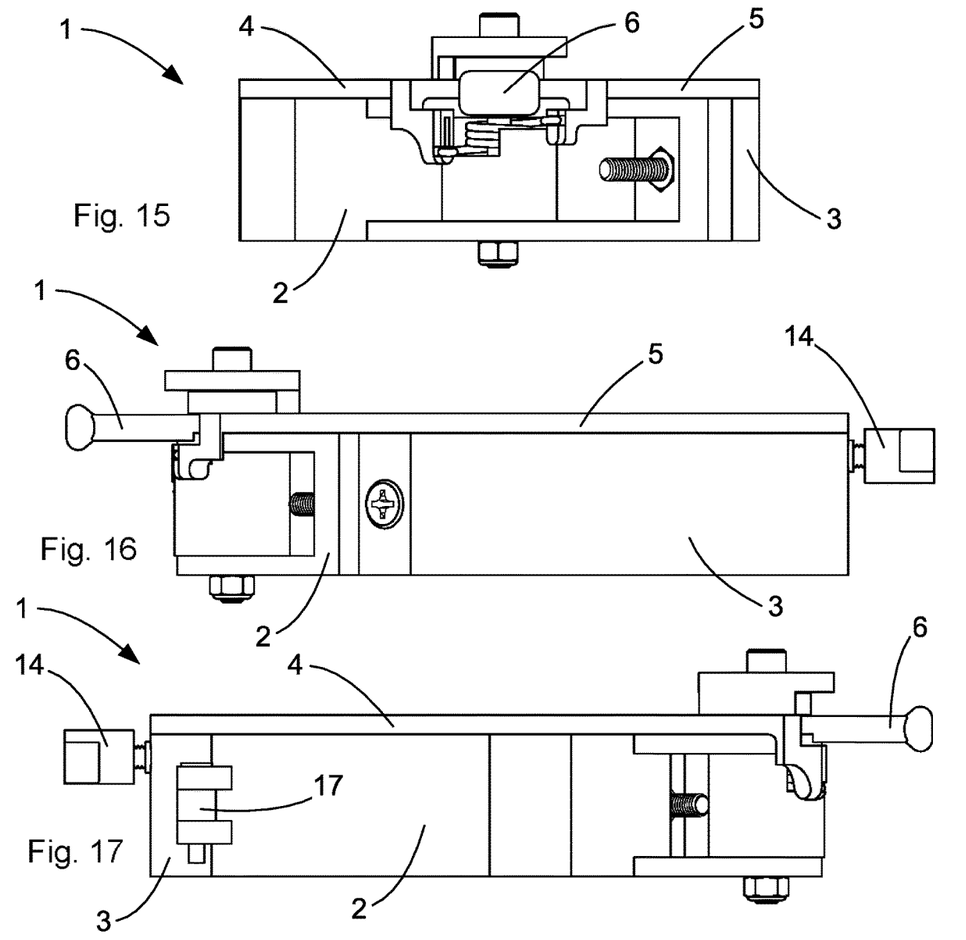
FIG. 15 is a rear elevation view of the safety cover in the closed condition.
FIG. 16 is a left elevation view of the safety cover in the closed condition.
FIG. 17 is a right elevation view of the safety cover in the closed condition.
Figure 18:
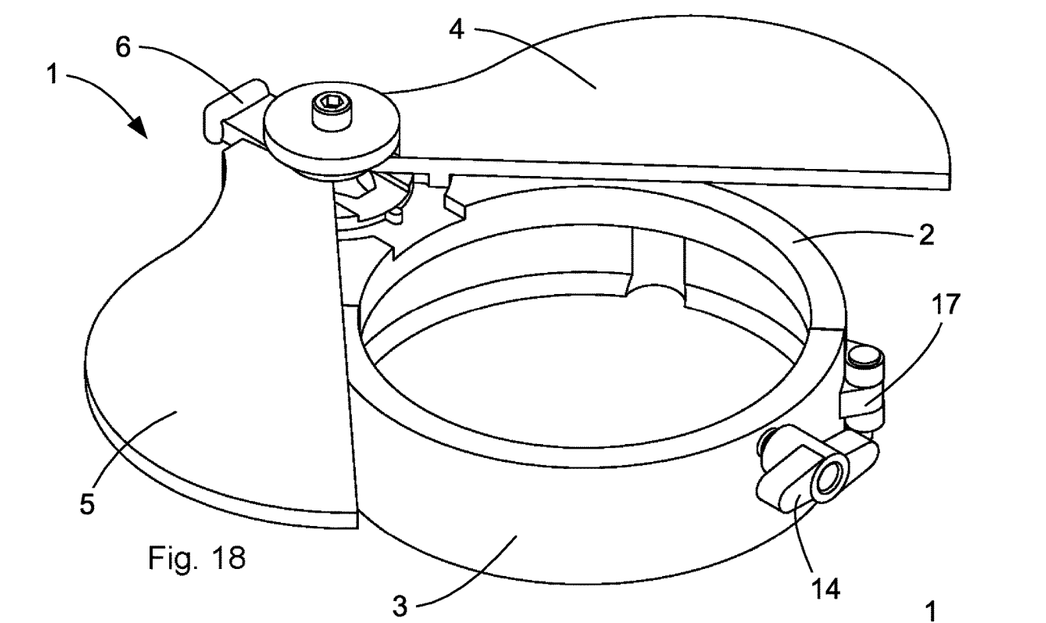
FIG. 18 is a top perspective view of the safety cover in an open condition.
Figure 19:
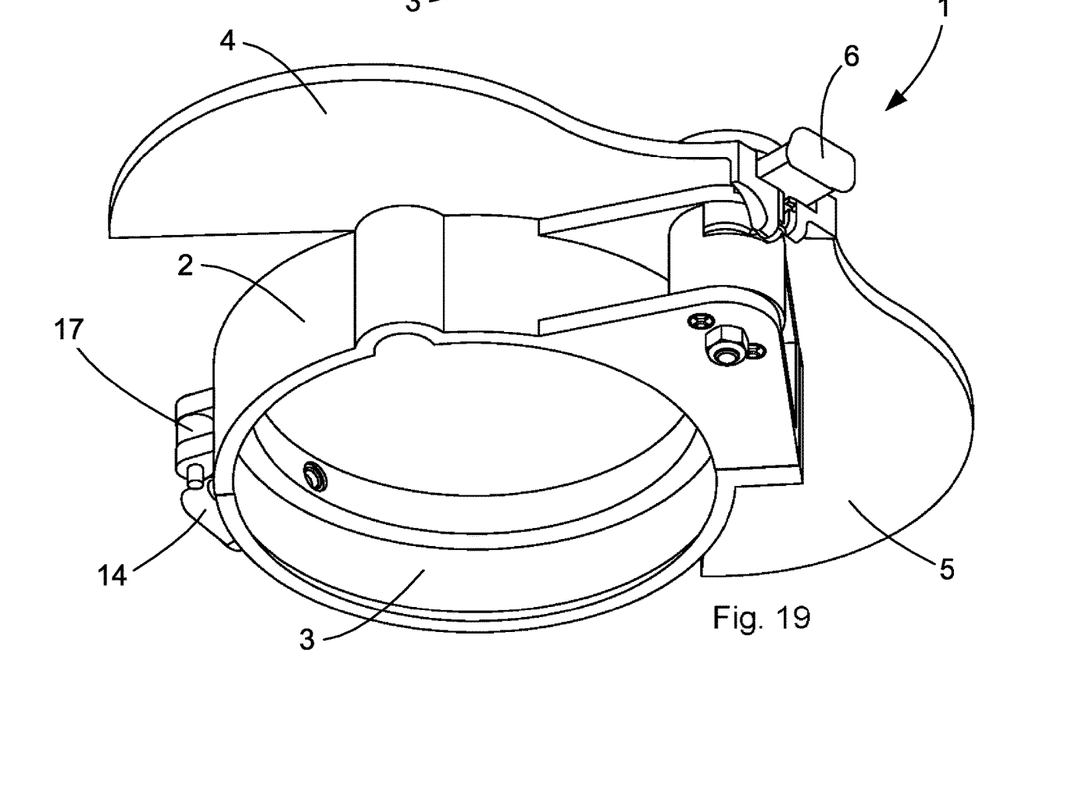
FIG. 19 is a bottom perspective view of the safety cover in an open condition.

With the mounting boss of the left slide cover 4 positioned on top of the mounting boss of the right slide cover 5 with their respective openings in alignment with each other and in alignment with the fastener opening(s) 23, a retaining screw 13 is installed through the aligned openings. This connects the slide covers 4, 5 to the mounting brackets 2, 3 in a manner such that the slide covers can pivot relative to the mounting brackets and relative to each other, about a pivot axis defined by a central axis of the retaining screw 13. FIG. 8 illustrates the slide covers 4, 5 pivoted to the closed position. FIG. 9 illustrates the slide covers 4, 5 pivoted to the open position.

The slide covers 4, 5 are configured so that they extend parallel to a plane defined by upper rim surfaces of the mounting brackets 2, 3, so as to engage and slide along the mounting brackets when pivoting between the open and closed positions. Since, in the installed condition of the safety cover 1, the mounting brackets 2, 3 are connected to the grinder head 28 at the upper inlet edge 37 at the mouth of the inlet throat 35, the slide covers 4, 5, in the closed condition, also close the inlet throat 35.

In operation, the left slide cover 4 and right slide cover 5 are rotationally pivoted to the open and closed conditions through the actuation of a slide plunger pin 6. The slide plunger pin 6 is configured to be actuated linearly, pressing the plunger inward toward the slide covers 4, 5 to place them in the open condition. The slide covers 4, 5 are spring biased toward the closed condition, and close under this spring bias when pressure on the slide plunger pin 6 is released. The slide covers 4, 5 are thus maintained in the closed condition until the slide plunger pin 6 is depressed, at which time they open, and remain open until the slide plunger pin is released, at which time the slide covers close automatically under the spring bias.

Figure 7A:
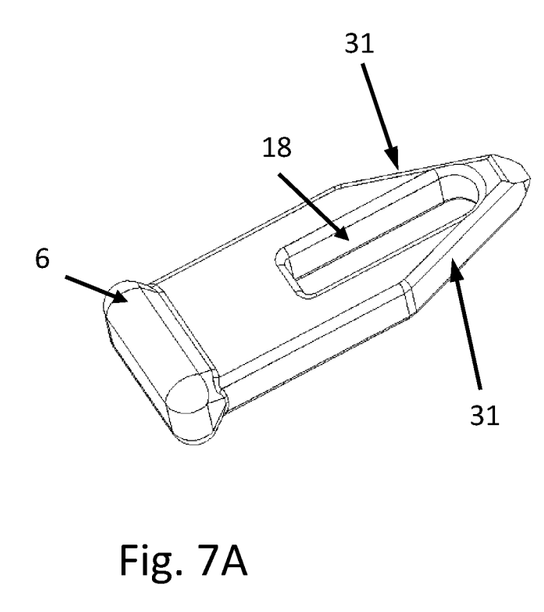
FIG. 7A is a perspective view illustrating a slider plunger pin component of the safety cover and features thereof.

The slide plunger pin 6 slides within a recessed retaining plunger slide grove 9 on the top surface of the left mounting bracket 3. As shown in FIG. 7A, the slide plunger pin 6 has a slotted opening 18 allowing the retaining screw 13 to pass therethrough in the assembled condition of the safety cover 1. The slotted opening 18 retains the slide plunger pin 6 positioned in the plunger slide groove 11 on the upper surface of the actuator housing 24. In the assembled condition of the safety cover 1, the plunger pin 6 is retained between the upper surface of the plunger slide groove 11 and the bottom surfaces of the left and right slide covers 4 and 5.

A return spring 10 mounted in the slotted opening 18 of the slide plunger pin 6, and is compressed against the retaining screw 13 when the slide plunger pin 6 is depressed. The return spring 10 causes the slide plunger pin to return to its non-actuated condition once manual pressure on the slide plunger pin is relieved. While the slide plunger pin 6 could rely on the spring bias of the slide covers to return it to its unactuated condition, the return spring 10 offers an additional layer of protection, ensuring that the slide plunger pin returns to the unactuated condition when pressure is relieved, even though the slide covers 4, 5 are maintained open, for example, by a meat tray being received in the inlet throat 35 (see, e.g., FIG. 1).

Figure 6:
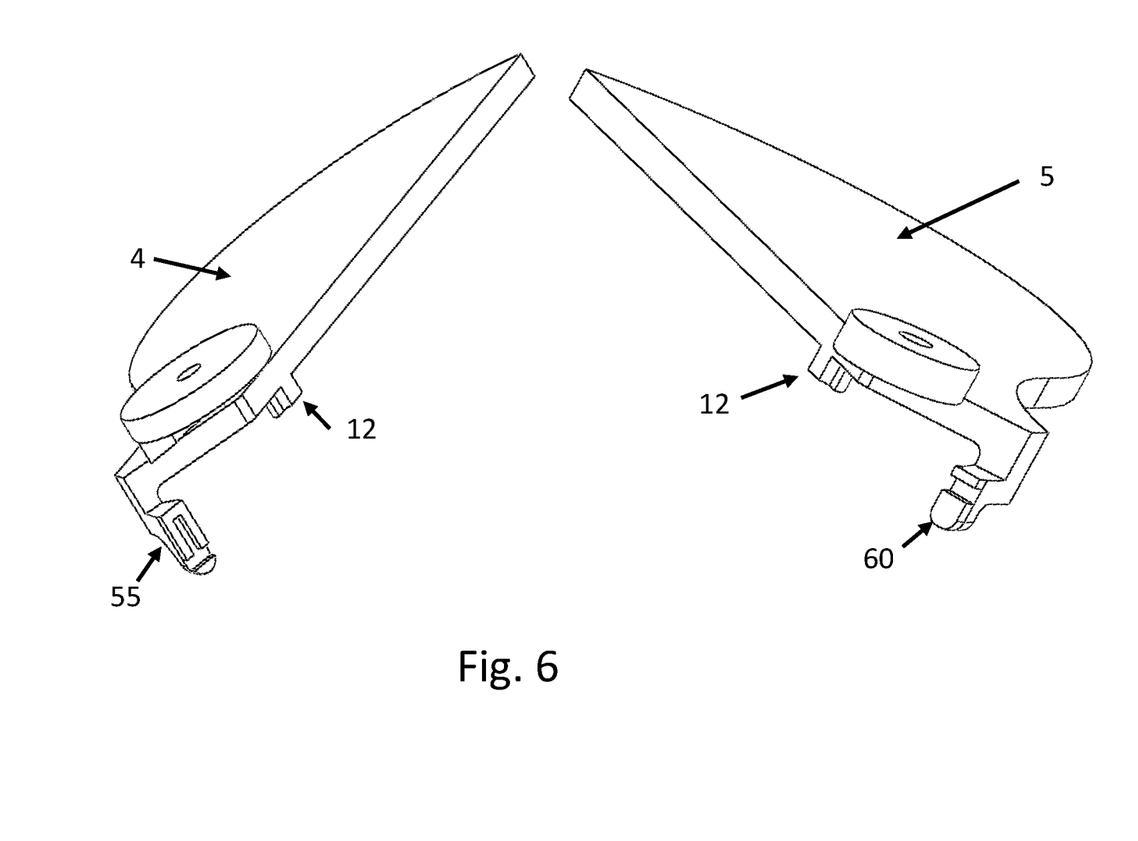
FIG. 6 is an exploded perspective view of a portion of the safety cover, specifically left and right slide covers and features thereof.

When the slide plunger pin 6 is depressed, it slides along the slide groove 11. Angled cam surfaces 31 of the slide plunger pin 6 engage respective slide cover bosses 12 on the left and right slide covers 4, 5 (see, e.g., FIG. 6). The slide cover bosses 12 travel in respective recessed grooves 9 formed in an upper surface of the actuator housing 24. When the cam surfaces 31 engage the slide cover bosses 12, normal forces between the angled cam surfaces and the bosses urges the slide covers 4, 5 to rotate about the axis to the open condition of FIG. 9. The rotation of the slide covers 4, 5 can be limited by the slide cover bosses 12 engaging the respective end surfaces of the grooves 9. This limits the degree to which the safety grinder cover 1 can be opened to gain access to the inlet throat 35.

When the grinder safety cover 1 is in the open position 40, a meat tray 30 can then be inserted in the grinder inlet throat 35 (see, FIG. 2). The grinder safety cover 1 in the open state position 40, with continued forward force applied to the slide plunger pin 6, provides an opening entrance allowing the meat tray 30 to be inserted into the grinding head inlet throat 35. Once the meat tray 30 is inserted in the inlet throat 35, pressure on the slide plunger pin 6 can be released. The meat tray 30, installed in the inlet throat 35, holds the safety slide cover 1 in the open position 40 (see FIGS. 2 and 9).

Figure 3:
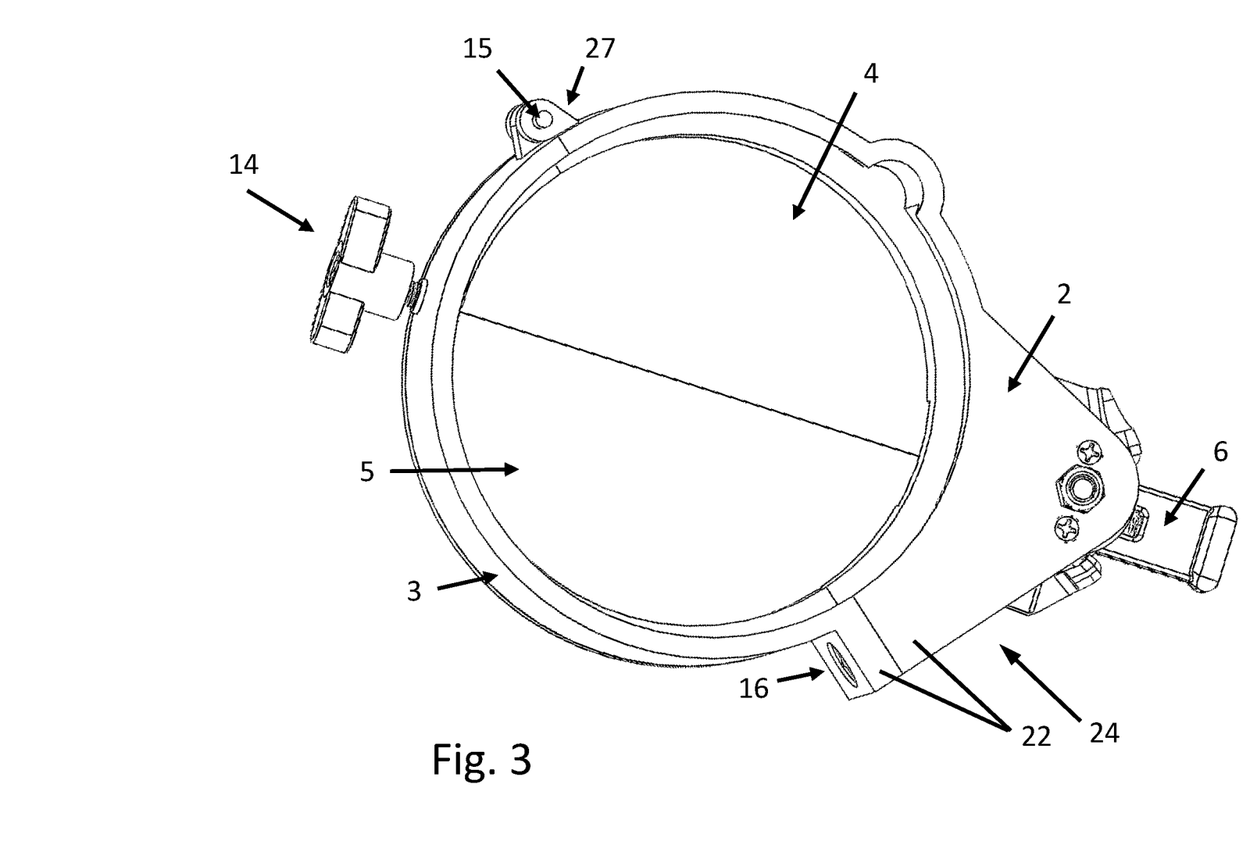
FIG. 3 is a bottom perspective view of the safety cover showing the mounting brackets forming a 360-degree circular clamp with an open center.
Figure 4:
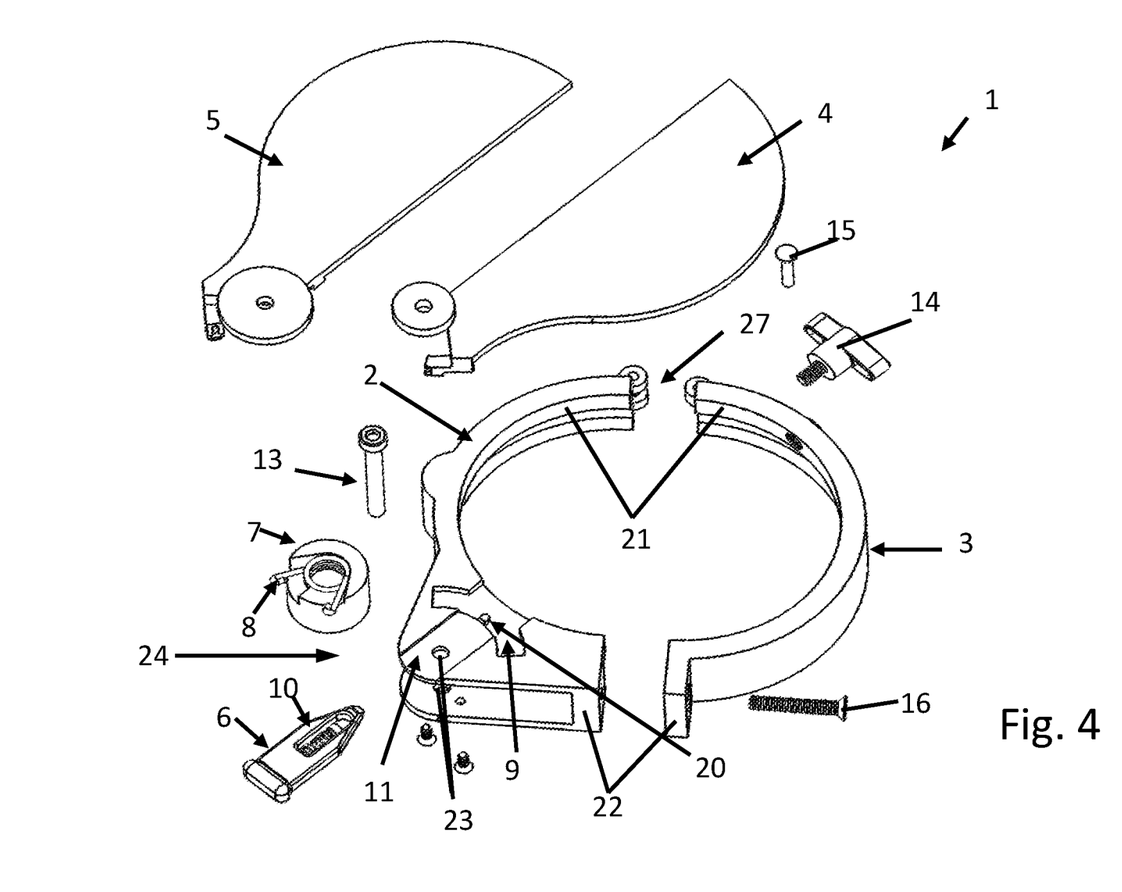
FIG. 4 is an exploded view detailing components of the safety cover.
Figure 5:
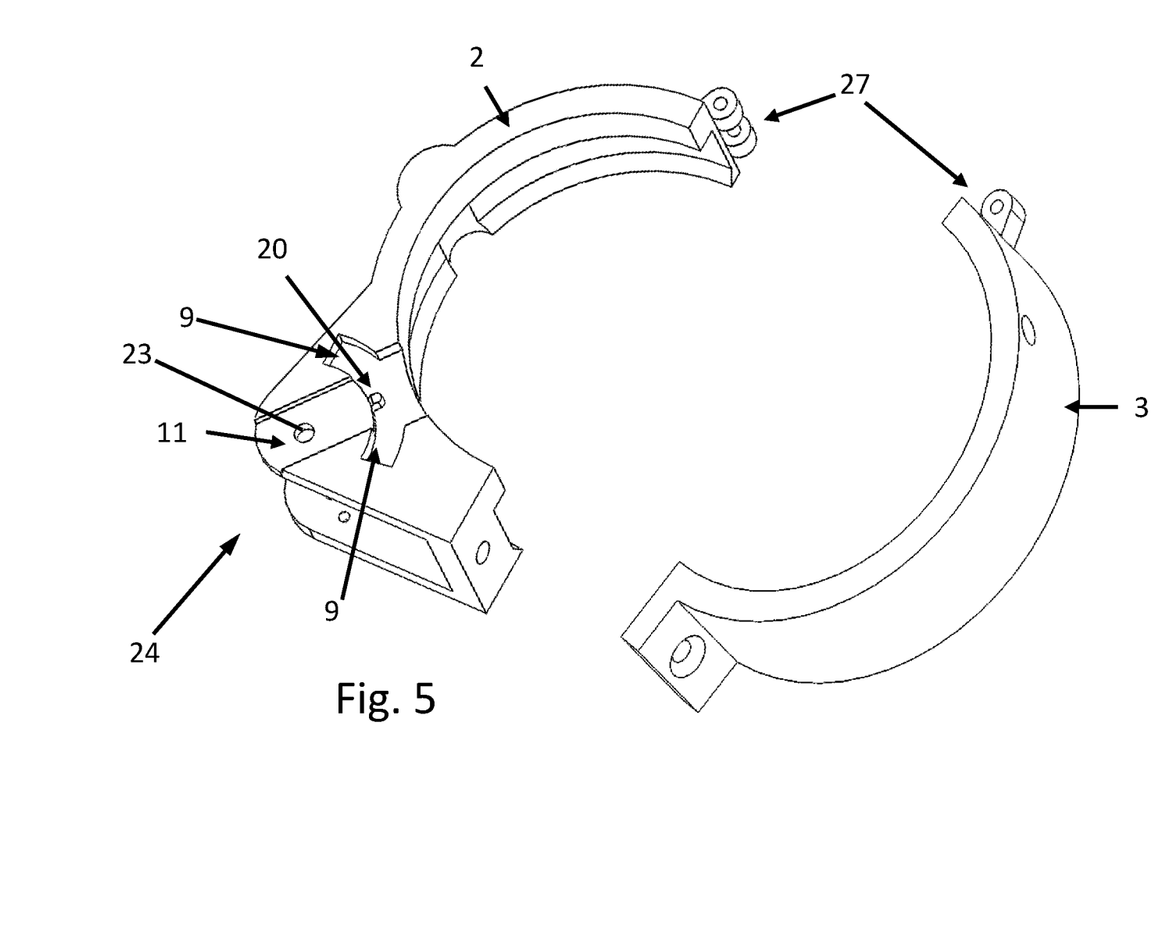
FIG. 5 is an exploded perspective view of a portion of the safety cover, specifically left and right mounting brackets and features thereof.
Figure 7B:
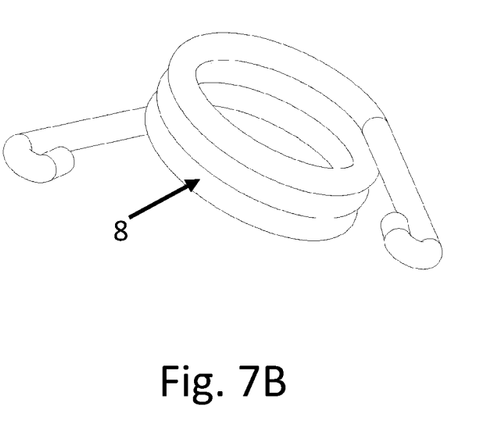
FIG. 7B is a perspective view illustrating a torsion spring component of the safety cover and features thereof.

Referring to FIGS. 4, and 7B a torsion spring 8 retained in a spring housing 7 that is installed in the actuator housing 24 of the left mounting bracket 2. The torsion spring 8 includes spring arm extensions that are placed in mechanical contact (for example, via a hooked engagement) with an extruded spring boss 55 on left slide cover 4 rear surface and an extruded spring boss 60 on the right slide cover 5 rear surface. Through this mechanical contact, the torsion spring 8 applies a spring return force on the left and right slide covers 4, 5 via the bosses 55, 60. This spring return force urges the left and right slide covers 4, 5 closed. The safety cover 1 therefore has a normally closed function, in which the cover returns to the closed condition in the absence of an applied external force, such as a depressed slide plunger pin 6 or an installed meat tray 30. As a result, when the meat tray 30 is removed from the inlet throat 35, the safety cover 1 automatically returns to the closed condition, as shown in FIG. 8. Referring to FIGS. 3 and 4, a centering boss 20 in the groove on the upper surface of the actuator housing 24 limits the closing positions of the left slide cover 4 and right slide cover 5 to the center position of the circular 360-degree ring center opening formed by left and right mounting brackets 2 and 3 of the grinder safety cover 1, as shown in FIG. 8.

REFERENCE NUMBERS

| | |
|---|---|
| 1. | Grinder Safety Cover |
| 2. | Left Mounting Bracket |

-continued

| 3. | Right Mounting Bracket |
| 4. | Left Slide Cover |
| 5. | Right Slide Cover |
| 6. | Slide Plunger Pin |
| 7. | Spring Housing |
| 8. | Torsion Spring |
| 9. | Slide Limit Grooves |
| 10. | Return Spring |
| 11. | Plunger Slide grooves |
| 12. | Slide Cover Boss |
| 13. | Retaining Screw |
| 14. | Friction Screw |
| 15. | Locking Pin |
| 16. | Clamping Screw |
| 17. | Hinge |
| 18. | Slotted Opening |
| 19. | Slide Cover Mounting Boss |
| 20. | Centering Boss |
| 21. | Annular Rim |
| 22. | Flange |
| 23. | Fastener Openings |
| 24. | Actuator Housing |
| 25. | Grinder |
| 26. | Base |
| 27. | Mounting Bracket Boss |
| 28. | Grinder Head |
| 29. | Motor |
| 30. | Meat Tray |
| 31. | Slide Plunger Cam Surfaces |
| 35. | Grinder Head Inlet Throat |
| 36. | Grinder Head Outlet |
| 37. | Lipper Edge of Inlet Throat |
| 40. | Safety Cover Open |
| 50. | Safety Cover Closed |
| 55. | Extruded boss |
| 60. | Extruded boss |

What is claimed:

1. A grinder safety cover attachment that is configured to be clamped to an inlet throat of a grinding head of a meat grinder and having an open condition for permitting access to the inlet throat and a closed condition blocking access to the inlet throat, the safety cover comprising:
a left mounting bracket and right mounting bracket configured to fit onto an outer surface of the inlet throat of the grinder head through fixation of a clamping screw that draws the mounting brackets toward each other so that the mounting brackets form a closed ring that clamps onto the outer surface of the inlet throat;
a left slide cover and a right slide cover mounted in engagement with and parallel to top surfaces of the left and right mounting brackets, the left and right slide covers being rotational relative to each other and relative to the mounting brackets to place the safety cover in the open condition and closed conditions, wherein the slide covers move away from each other in the open condition of the safety cover to permit access to the inlet throat, and wherein the slide covers move toward each other and into engagement with each other in the closed condition of the safety cover to block access to the inlet throat, the slide covers being spring biased to the closed condition;
a slide plunger pin configured to be actuated through the application of an actuation force urged by depressing the slide plunger pin linearly into engagement with the left and right slide covers, which causes them to rotate relative to each other and to the mounting brackets to the open condition;
wherein the left and right slide covers are configured to return to the closed condition in response to the removal of the actuation force.

2. The safety cover recited in claim 1, wherein the left and right mounting brackets have first ends pivotally connected to each other and opposite second ends configured to be connected to each other with a locking pin, wherein the left and right mounting brackets each have a semi-circular configuration and, when connected with the locking pin, are configured to form a closed circular ring with an cylindrical inner surface configured to engage and mate with the cylindrical outer surface of the inlet throat.

3. The safety cover recited in claim 1, wherein the mounting brackets comprise an annular rim for engaging an edge of a mouth of the inlet throat.

4. The safety cover recited in claim 1, further comprising a friction screw that engages the outer surface of the grinder head to lock the safety cover onto the inlet throat and to preventing rotation of the safety cover about the inlet throat.

5. The safety cover recited in claim 1, wherein the left and right slide covers are pivotally connected to the mounting brackets by a retaining screw.

6. The safety cover recited in claim 1, wherein the slide plunger pin is retained in a recessed groove in an upper surface of an actuator portion of one or both of the mounting brackets, the slide plunger pin being retained in the recessed groove by the bottom surface of the left and right slide covers, wherein the application of the actuation force causes the slide plunger pin to move linearly in the recessed groove into engagement with the left and right slide covers, which causes them to rotate relative to each other and to the mounting brackets to the open condition.

7. The safety cover recited in claim 5, further comprising a return spring that biases the slide plunger pin toward the non-actuated condition, wherein the return spring is configured to return the slide plunger pin to the non-actuated condition in response to removal of the the actuation force.

8. The safety cover recited in claim 7, wherein the slide plunger pin comprises a central slot in which the return spring is housed, wherein the retaining screw extends through the slide covers and the central slot retains the slide plunger pin in the recessed groove, and wherein the return spring biases the slide plunger pin against the retaining screw.

9. The safety cover recited in claim 5, wherein the slide plunger pin comprises a pair of angled cam surfaces configured to engage respective bosses on the left and right slide covers, the cam surfaces when urged against the bosses on the slide covers exert normal forces on the bosses that causes the slide covers to move toward the open condition of the safety cover against the spring bias urging the slide covers to the closed condition.

10. The safety cover recited in claim 1, wherein the left and right slide covers slide in direct contact with the top surface of the mounting brackets and parallel to the top surface of the mounting brackets.

11. The safety cover recited in claim 1, further comprising a torsion spring for applying the spring bias to the left and right slide covers, the torsion spring being housed in a spring housing that is retained in the actuator housing, the torsion spring including spring extensions in mechanical contact with the left slide cover and right slide cover, wherein the spring force applied by the torsion spring to the left slide cover and right slide cover move the slide covers to a center normally closed position.

12. The safety cover recited in claim 1, wherein the left and right slide covers comprise respective bosses on their lower surfaces, wherein the bosses are configured to slide within recessed grooves on the upper surface of the actuator housing, the recessed grooves being configured to provide a rotational guide and opening limits for the left and right slide covers on the top surface of the mounting brackets, the recessed grooves limiting the rotational stroke of the left and right slide covers in the open position to the outer diameter of the grinding head inlet throat.

13. The safety cover recited in claim 1, further comprising a centering boss on the upper surface of the actuator housing, the centering boss defining stop points for the left and right slide covers, the centering boss being configured so that the slide covers when limited by the centering boss are themselves centered over the circular ring opening of the connected left and right mounting brackets.

14. The safety cover recited in claim 1, wherein the slide plunger pin facilitates opening the slide covers with a single hand of the operator by depressing the slide plunger pin.

* * * * *